UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

2-ALKOXY-5-DISUBSTITUTED BARBITURIC ACIDS.

1,038,101.  Specification of Letters Patent.  Patented Sept. 10, 1912.

No Drawing.  Application filed December 9, 1911. Serial No. 664,889.

*To all whom it may concern:*

Be it known that I, MAX ENGELMANN, doctor of philosophy, chemist, citizen of the German Empire, residing at Elberfeld, Germany, have invented new and useful Improvements in 2-Alkoxy-5-Disubstituted Barbituric Acids, of which the following is a specification.

My invention concerns the production of the hitherto unknown 2-alkoxy-barbituric acids of the formula:

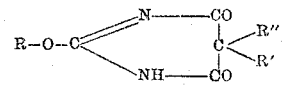

(R is an alkyl, R″ is alkyl, and R′ an aromatic substituent *e. g.* —C₆H₅, —CH₂C₆H₅) which have proved to be valuable soporifics, an average dose being from ¼ to ½ gram. The process for their production consists in treating the ethers of isourea of the formula:

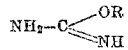

(R=a substituent *e. g.* alkyl or aralkyl) or their salts with disubstituted malonyl haloids.

The new products are crystalline compounds being converted by treating them with acids into the 5-dialkyl- or arylalkyl barbituric acids.

In order to illustrate the new process more fully the following example is given, the parts being by weight:—60 parts of the methylether of isourea hydrochlorid:

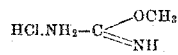

(*Berichte der Deutschen Chemischen Gesellshaft*, vol. 33, 1900, p. 810) are dissolved in 100 parts of water and 123 parts of phenyl-ethylmalonylchlorid dissolved in 1400 parts of benzene are added. While cooling and stirring 320 parts of caustic soda lye (27 per cent.) are poured to this solution until the mixture reacts alkaline. When the reaction is complete the benzene is distilled off. The 2-methoxy-5-phenylethyl-barbituric acid separates in a white crystalline shape. It is after drying recrystallized from alcohol. It melts at 152° C. and is rather slightly soluble in cold water but easily soluble in alcohol, benzene and acids. By heating the ether with an acid *e. g.* HCl it is converted into the 5-phenylethylbarbituric acid. For this purpose 100 parts of the ether are heated with 200 parts of a 30 per cent. hydrochloric acid on the water bath chloromethyl being disengaged. The 2-methoxy-5-diethylbarbituric acid melts at 131° C.

Instead of the methylether other derivatives *e. g.* isourea-ethyl-ether or isourea-benzyl-ether can also be used.

I claim:—

1. The herein described 2-alkoxy-barbituric acids having most probably the formula:

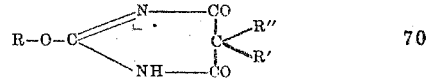

in which R=alkyl, R″=alkyl, and R′=an aromatic substituent, being crystalline powders; being converted into 5-disubstituted barbituric acids by treatment with a hot acid; and being valuable soporifics, substantially as described.

2. The herein described 2-methoxy-5-phenyl-ethyl-barbituric acid being a white crystalline powder melting at 152° C. difficultly soluble in cold water, easily soluble in alcohol, benzene and acids; and being a valuable soporific, substantially as described.

In testimony whereof I have hereunto set my hand in the presence of two subscribing witnesses.

MAX ENGELMANN. [L. S.]

Witnesses:
 HELEN NUFER,
 A. NUFER.